United States Patent
Koper et al.

(10) Patent No.: US 7,814,357 B2
(45) Date of Patent: Oct. 12, 2010

(54) METHOD FOR SCHEDULED POWER OVER ETHERNET PORT DISABLING AND OVERRIDE MECHANISM

(75) Inventors: Ezra Koper, Gan Yavne (IL); David Pincu, Holon (IL); Simon Kahn, Jerusalem (IL)

(73) Assignee: Microsemi Corp.-Analog Mixed Signal Group Ltd., Hod Hasharon (IL)

( * ) Notice: Subject to any disclaimer, the term of this patent is extended or adjusted under 35 U.S.C. 154(b) by 736 days.

(21) Appl. No.: 11/752,939

(22) Filed: May 24, 2007

(65) Prior Publication Data

US 2007/0288784 A1 Dec. 13, 2007

Related U.S. Application Data

(60) Provisional application No. 60/804,453, filed on Jun. 12, 2006.

(51) Int. Cl.
*G06F 1/26* (2006.01)
(52) U.S. Cl. ........................ 713/340; 713/300
(58) Field of Classification Search ................ 713/300, 713/340
See application file for complete search history.

(56) References Cited

U.S. PATENT DOCUMENTS

| 4,255,787 | A | 3/1981 | Hoffmann et al. | |
|---|---|---|---|---|
| 6,765,608 | B1* | 7/2004 | Himeda et al. | 348/211.5 |
| 6,909,941 | B2 | 6/2005 | Scott et al. | |
| 2004/0218324 | A1* | 11/2004 | Ferentz | 361/90 |
| 2005/0197742 | A1 | 9/2005 | Scott et al. | |
| 2006/0165110 | A1* | 7/2006 | Magendanz et al. | 370/419 |
| 2007/0030613 | A1* | 2/2007 | Sousa et al. | 361/92 |
| 2007/0038769 | A1* | 2/2007 | Ryan et al. | 709/230 |
| 2007/0067065 | A1 | 3/2007 | El-Gasseir et al. | |
| 2008/0100141 | A1* | 5/2008 | Lee et al. | 307/43 |

* cited by examiner

*Primary Examiner*—Tse Chen
(74) *Attorney, Agent, or Firm*—Simon Kahn

(57) ABSTRACT

A system and method for power over Ethernet comprising: a plurality of power over Ethernet supplying ports; and a management station in communication with each of the plurality of power over Ethernet supplying ports, the management station being operative to: disable at least one first power over Ethernet supplying port of the plurality of power over Ethernet supplying ports on a predetermined scheduled basis. Preferably the management station is further operative to: receive an entry indication; and enable the disabled at least one first power over Ethernet supplying port responsive to the received entry indication.

24 Claims, 4 Drawing Sheets

Fig. 3

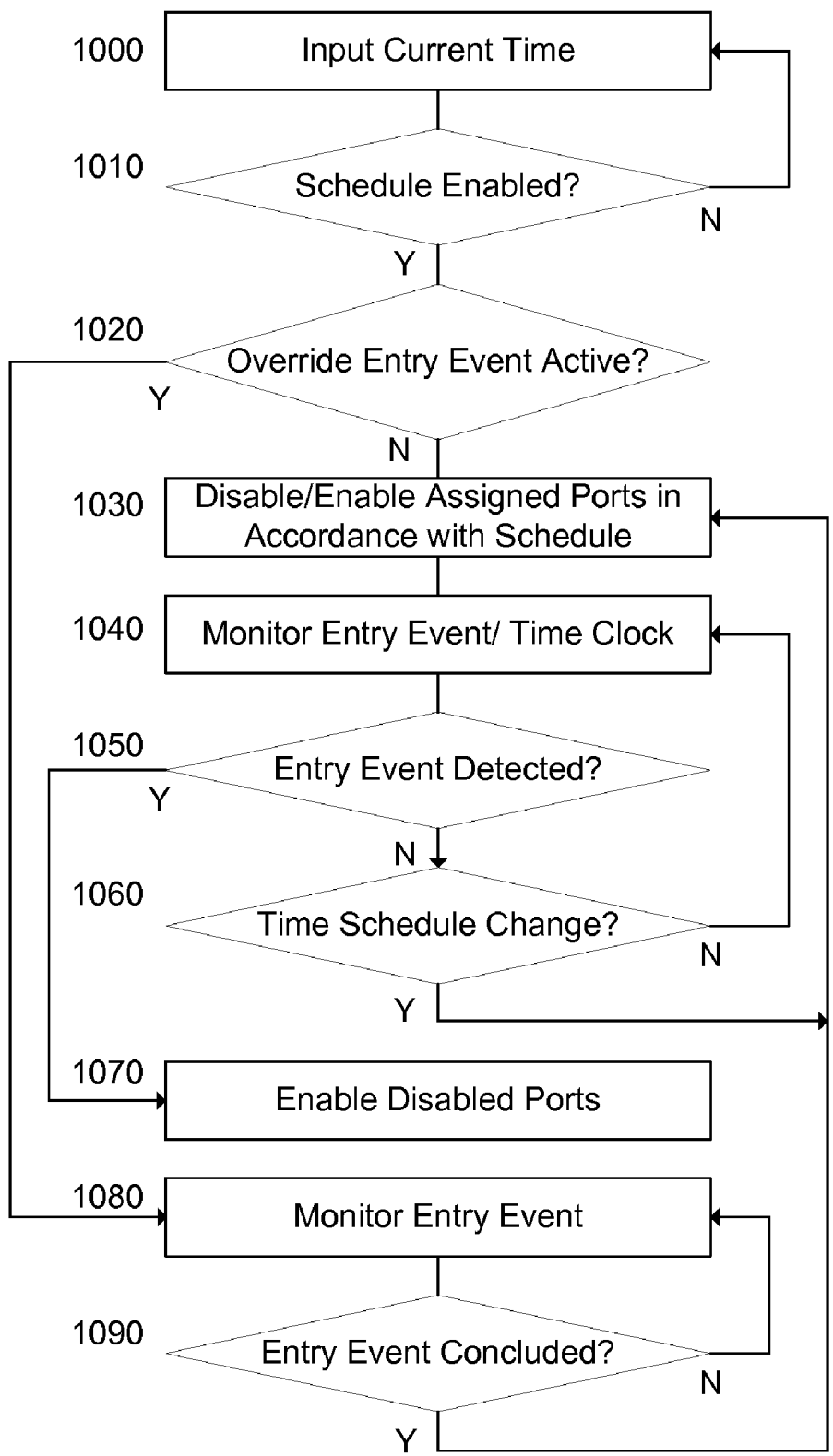

METHOD FOR SCHEDULED POWER OVER ETHERNET PORT DISABLING AND OVERRIDE MECHANISM

CROSS-REFERENCE TO RELATED APPLICATIONS

This application claims priority from U.S. Provisional Patent Application Ser. No. 60/804,453 to Koper et al, filed Jun. 12, 2006 and entitled "METHOD FOR SCHEDULED POWER OVER ETHERNET PORT DISABLING AND OVERRIDE MECHANISM", the entire contents of which is incorporated herein by reference.

BACKGROUND OF THE INVENTION

The present invention relates to a scheduled power outage for power over Ethernet ports and more particularly to a method of a scheduled disabling of power over Ethernet ports and overriding the scheduled disabling responsive to a detected entry event.

The growth of local and wide area networks based on Ethernet technology has been an important driver for cabling offices and homes with structured cabling systems having multiple twisted wire pairs. The structured cable is also known herein as communication cabling and typically comprises four twisted wire pairs. In certain networks only two twisted wire pairs are used for communication, with the other set of two twisted wire pairs being known as spare pairs. In other networks all four twisted wire pairs are used for communication. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

The IEEE 802.3af-2003 standard, published by the Institute of Electrical and Electronics Engineers, Inc, New York, whose entire contents are incorporated herein by reference, is addressed to powering remote devices over an Ethernet based network. Power can be delivered to the powered device (PD) either from a power sourcing equipment (PSE) associated with the switch/hub known as an endpoint PSE or alternatively via a midspan PSE connected between the switch/hub equipment and the PD. A PSE as used in this document may supply power over Ethernet to one or more ports, and a single PSE is defined as power sourcing equipment contained in a single chassis. In either case power is delivered over a set of two twisted pairs. PoE ports of either a midspan PSE or an endpoint PSE can typically by remotely controlled from a management station. In one embodiment, each port may be controlled to one of an enabled state, in which a powered device is automatically detected if attached thereto and powered, and a disabled state in which detection does not occur. In yet another embodiment each port in a disabled state performs detection on a periodic basis, however a detected PD is not powered.

PDs comprise a whole host of data terminal units for which power is advantageously delivered via the communication cabling. Specific examples of PDs included voice over Internet protocol (VoIP) telephones, wireless access points (WAPs) and access control devices.

Wiring of a system according to the IEEE 802.3 standard, published by the Institute of Electrical and Electronics Engineers, Inc, New York the entire contents of which is incorporated herein by reference, typically comprises cables terminated at a work area in a telecommunications outlet/connector (TO) as defined by TIE/EIA 568 published by the Telecommunications Industry Association 2001 of Arlington, Va., and by ISO/IEC 11801 published by the International Organization for Standardization and the International Electrotechnical Commission, Geneva, Switzerland, the entire contents of both of which are incorporated herein by reference. The TO is connected via horizontal cabling, optionally through at most one each of a transition or consolidation point, a user patch panel and an equipment patch panel to the common equipment which typically comprises a switch/hub or bridge. Optionally, a midspan device may be connected between the common equipment and one user patch panel to provide power. The connections between the common equipment and the TO may be changed by rearranging patch cords connected between any of the common equipment, the user patch panel and the equipment patch panel. In an installation in which both a user patch panel and an equipment patch panel are provided, or a midspan device and a user patch panel are provided, the connections between the common equipment and the TO are typically changed by rearranging patch cords between the equipment patch panel or the midspan device and the user patch panel.

Office hours and business days are well known features of the work week. Office security is improved by a scheduled disabling of PoE ports during hours and/or days which are not scheduled for work, thereby disabling WAPs when the office is not populated. Additionally, power can be saved by disabling PoE ports during non-business days, and/or non-office hours. Such a scheduled disabling is preferably accomplished from a management station operable by authorized personnel. Unfortunately, a user who unexpectedly requires the use of a PD, such as a WAP, which is connected to a scheduled disabled port finds the PD inoperable. The user may not have access to the management station which has set the port to be disabled.

What is therefore needed, and not known in the prior art, is a method for scheduled disabling of PoE ports, and a method of overriding the scheduled disabling without requiring access to the management station.

SUMMARY OF THE INVENTION

Accordingly, it is a principal object of the present invention to overcome the disadvantages of prior art. This is provided in the present invention by providing a method of designating ports to be disabled on a predetermined scheduled basis and associating therewith a particular entry event which is designated to act as an override key. In an exemplary embodiment the entry event is a PoE device being detected connected to a designated override key port which is an open TO, i.e. a TO to which no data terminal device is connected.

The override key port, upon detection of a valid PD, reports the detection to the management work station, which in response overrides the predetermined scheduled disabling and enables the associated disabled ports. Thus, PoE for a group of ports is enabled responsive to a single detected PD. The override key port is further monitored to detect disconnection of the PD. Upon detection of the disconnection, the disconnection is reported to the management work station, which in response reinstates the predetermined scheduled disabling and disables the associated ports.

The valid PD to be used as a key may be a normal device, or a dedicated key designed specifically to be detected as a valid PD. In one embodiment the detected PD comprises a PD tester.

In another embodiment the entry event is an event recorded by an access control system such as an alarm system. In yet another embodiment the entry event is the enabling of illumination in a pre-designated area and in yet another embodiment the entry event is sensing illumination in a pre-designated area.

The invention provides for a method of controlled enabling and disabling of ports, the method comprising: providing a plurality of power over Ethernet supplying ports; and disabling at least one first power over Ethernet supplying port of the provided plurality of ports on a predetermined scheduled basis.

In one embodiment the method further comprises: detecting a powered device on a second power over Ethernet supplying port of the provided plurality of power over Ethernet supplying ports; and responsive to the detected powered device, enabling the at least one first power over Ethernet supplying port. In one further embodiment the method further comprises: monitoring at least one parameter of the second power over Ethernet supplying port indicative of a connection status of the detected powered device; and in the event the monitored parameter is indicative that the powered device has been disconnected, disabling the at least one first power over Ethernet supplying port in accordance with the predetermined scheduled basis. In one yet further embodiment the method further comprises: in the event the monitored parameter is not indicative that the powered device has been disconnected, maintaining the enabling. In another yet further embodiment the monitored parameter is one of a DC maintain power signature component and an AC maintain power signature component.

In one further embodiment the powered device consists of functionality limited to being detected as a powered device and maintaining parameters indicative of connection. In another further embodiment the at least one first power over Ethernet supplying port represents a group of power over Ethernet supplying ports within a first power sourcing equipment. Preferably the second power over Ethernet supplying port is associated with a second power sourcing equipment different than the first power sourcing equipment. In yet another further embodiment the second power over Ethernet supplying port is different from the at least one first power over Ethernet supplying port.

The invention also provides for a method of scheduled disabling of ports, the method comprising: providing a plurality of power over Ethernet supplying ports; disabling at least one first power over Ethernet supplying port of the provided plurality of power over Ethernet supplying ports on a predetermined scheduled basis; detecting a first entry event; and responsive to the detected entry event, enabling the at least one first power over Ethernet supplying port.

In one embodiment the entry event comprises an authorized entry signal from an entry access system, in another embodiment the entry event comprises switching a pre-determined switch, in another embodiment the entry event comprises illuminating area lighting and in another embodiment the entry event comprises detecting illumination of at least one lighting zone.

In one embodiment the method further comprises: monitoring the entry event to detect a conclusion of a second entry event, and responsive to the conclusion of the second entry event, disabling the at least one first power over Ethernet supplying port of the provided plurality of power over Ethernet supplying ports on the predetermined scheduled basis. Preferably, the first entry event and the second entry event are the same.

The invention also provides for a system for power over Ethernet comprising: a plurality of power over Ethernet supplying ports; and a management station in communication with each of the plurality of power over Ethernet supplying ports, the management station being operative to disable at least one first power over Ethernet supplying port of the plurality of power over Ethernet supplying ports on a predetermined scheduled basis.

In one embodiment the management station is further operative to: receive an entry indication; and enable the disabled at least one first power over Ethernet supplying port responsive to the received entry indication.

In one further embodiment the entry indication comprises detection of a valid powered device at a second power over Ethernet supplying port. In one yet further embodiment the management station is further operative to: receive an indication of disconnection of the detected valid powered device from the second power over Ethernet supplying port; and responsive to the received indication disable the at least one first power over Ethernet supplying port on the pre-determined scheduled basis. In another yet further embodiment the second power over Ethernet supplying port is different from the at least one first power over Ethernet supplying port.

In one further embodiment the entry indication comprises a signal from an entry access system, in another further embodiment the entry indication comprises operation of a pre-determined switch, and in another further embodiment the entry indication comprises illuminating area lighting.

In another further embodiment the management station is further operative to: monitor the entry event to detect a conclusion of the entry event, and responsive to the conclusion of the entry event, disable the at least one first power over Ethernet supplying port of the provided plurality of power over Ethernet supplying ports on the predetermined scheduled basis.

In another further embodiment the at least one first power over Ethernet supplying port comprises a third and a fourth Ethernet supplying port, the entry indication enabling the third Ethernet supplying port and not enabling the fourth Ethernet supplying port.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 3 is a high level block diagram of user interface for a scheduled disabling of ports and an override mechanism in accordance with a principle of the current invention; and FIG. 4 is a high flow chart of the operation of the management workstation of FIGS. 1 and 2 to disable ports on a scheduled basis, and override the scheduled disabling in accordance with a principle of the current invention.

DETAILED DESCRIPTION OF PREFERRED EMBODIMENTS

Figure 1:
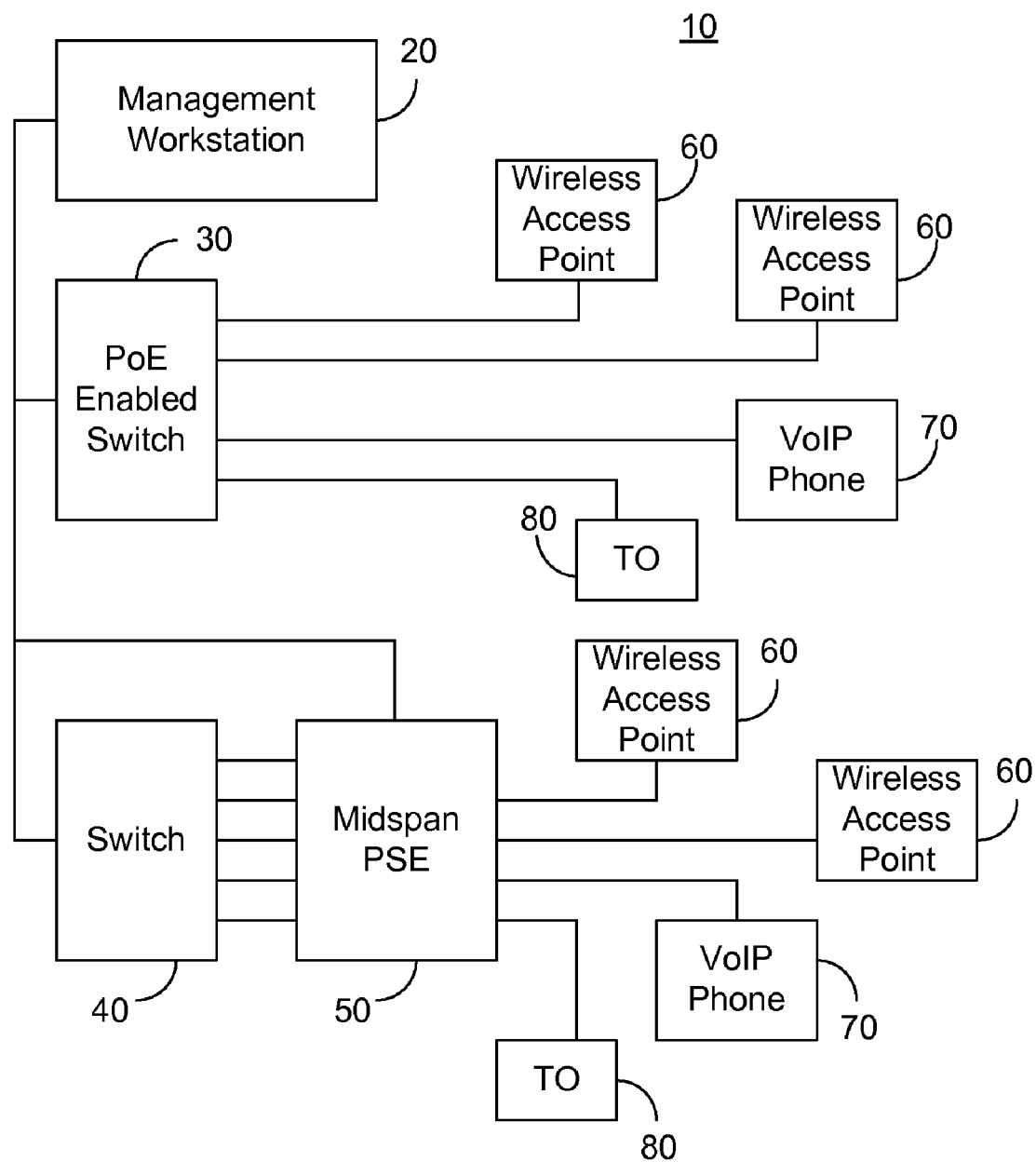
FIG. 1 is a high level block diagram of a first embodiment of a PoE system having a plurality of ports and a management workstation running a network management system in accordance with a principle of the current invention, the PoE system exhibiting at least one telecommunications outlet (TO) designated as an override key port.

The present embodiments enable a method of designating ports to be disabled on a predetermined scheduled basis and associating therewith a particular entry event which is designated to act as an override key. In an exemplary embodiment the entry event is a PoE device being detected connected to a designated override key port which is an open TO, i.e. a TO to which no data terminal device is connected.

The override key port, upon detection of a valid PD, reports the detection to the management work station, which in response overrides the predetermined scheduled disabling and enables the associated disabled ports. Thus, PoE for a group of ports is enabled responsive to a single detected PD. The override key port is further monitored to detect disconnection of the PD. Upon detection of the disconnection, the disconnection is reported to the management work station, which in response reinstates the predetermined scheduled disabling and disables the associated ports.

The valid PD to be used as a key may be a normal device, or a dedicated key designed specifically to be detected as a valid PD. In one embodiment the detected PD comprises a PD tester.

In another embodiment the entry event is an event recorded by an access control system such as an alarm system. In yet another embodiment the entry event is the enabling of illumination in a pre-designated area and in yet another embodiment the entry event is sensing illumination in a pre-designated area.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level block diagram of a is a high level block diagram of a first embodiment of a PoE system, designated PoE system 10, having a plurality of ports and a management workstation running a network management system in accordance with a principle of the current invention, the PoE system exhibiting at least one monitored telecommunications outlet designated as an override key port. PoE system 10 comprises: a management work station 20; a PoE enabled switch 30; a switch 40; a midspan PSE 50; a plurality of WAPs 60; a plurality of VoIP telephones 70; and a plurality of TOs 80 which are designated as an override key port. It is it to be understood that in a typical embodiment of system 10 each VoIP telephone 70 and WAP 60 are connected via an associated TO, such as an RJ-45 jack. TO 80 is distinguished by having no PD or other data terminal device connected thereto and being designated as will be described further hereinto below as an override key port.

Management work station 20 is connected through a network connection, either physical or logical, to PoE enabled switch 30, switch 40 and midspan PSE 50. PoE enabled switch 30 exhibits a plurality of ports, some of the plurality of ports being connected to a respective WAP 60, VoIP telephone 70 and TO 80. Switch 40 exhibits a plurality of ports; at least some of the ports of switch 40 are connected to midspan PSE 50. Midspan PSE 50 exhibits a plurality of ports; some of the plurality of ports being connected to a respective WAP 60, VoIP telephone 70 and TO 80.

In operation, PoE enabled switch 30 provides data communication and supplies power over the data communication cabling for each WAP 60 and VoIP phone 70 connected thereto. PoE enabled switch 30 reports all powering events to management workstation 20, and further each port for which PoE enabled switch 30 supplies power to a connected PD may be enabled or disabled under control of management workstation 20. In one embodiment when a PoE supplying port of PoE enabled switch 30 is disabled, PoE enabled switch 30 does not act to periodically attempt to detect a valid PD connected to the disabled port. In another embodiment PoE enabled switch 30 continues to periodically attempt to detect a valid PD connected to the disabled PoE supplying port, however power is not supplied irrespective of the results of the detection. PoE enabled switch 30 further acts to periodically attempt to detect a valid PD connected to TO 80, preferably in accordance with the detection protocol of IEEE 802.3af-2003 reference above, and to reports the results of the detection attempt to management workstation 20.

Switch 40 provides data communication for each WAP 60 and VoIP phone 70 connected thereto via midspan PSE 50. Midspan PSE 50 provides power over the data communication cabling for each WAP 60 and VoIP phone 70 connected thereto. Midspan PSE 50 reports all powering events to management workstation 20, and further each port for which midspan PSE 50 supplies power to a connected PD may be enabled or disabled under control of management workstation 20. In one embodiment when a PoE supplying port of midspan PSE 50 is disabled, midspan PSE 50 does not act to periodically attempt to detect a valid PD connected to the disabled port. In another embodiment midspan PSE 50 continues to periodically attempt to detect a valid PD connected to the disabled PoE supplying port, however power is not supplied irrespective of the results of the detection. Midspan PSE 50 further acts to periodically attempt to detect a valid PD connected to TO 80, preferably in accordance with the detection protocol of IEEE 802.3af-2003 reference above, and to reports the results of the detection attempt to management workstation 20.

Management workstation 20 is operative to disable at least one designated port of PoE enabled switch 30 or midspan PSE 50 on a pre-determined scheduled basis. Management workstation 20 is further operative upon receiving a report from PoE enabled switch 30 or midspan PSE 50 of a valid PD being detected on a selected TO 80 to override the scheduled disabling of at least one port of PoE enabled switch 30 and/or midspan PSE 50. In an exemplary embodiment a PD which has functionality limited to being detected as a powered device and maintaining parameters indicative of connection is connected by a user to TO 80 thereby prompting management workstation 20 to override the scheduled disabling of at least one port. A PD exhibiting such limited functionality is available as a PoE Tester from PowerDsine, Ltd., Hod Hasharon, Israel.

Figure 2:
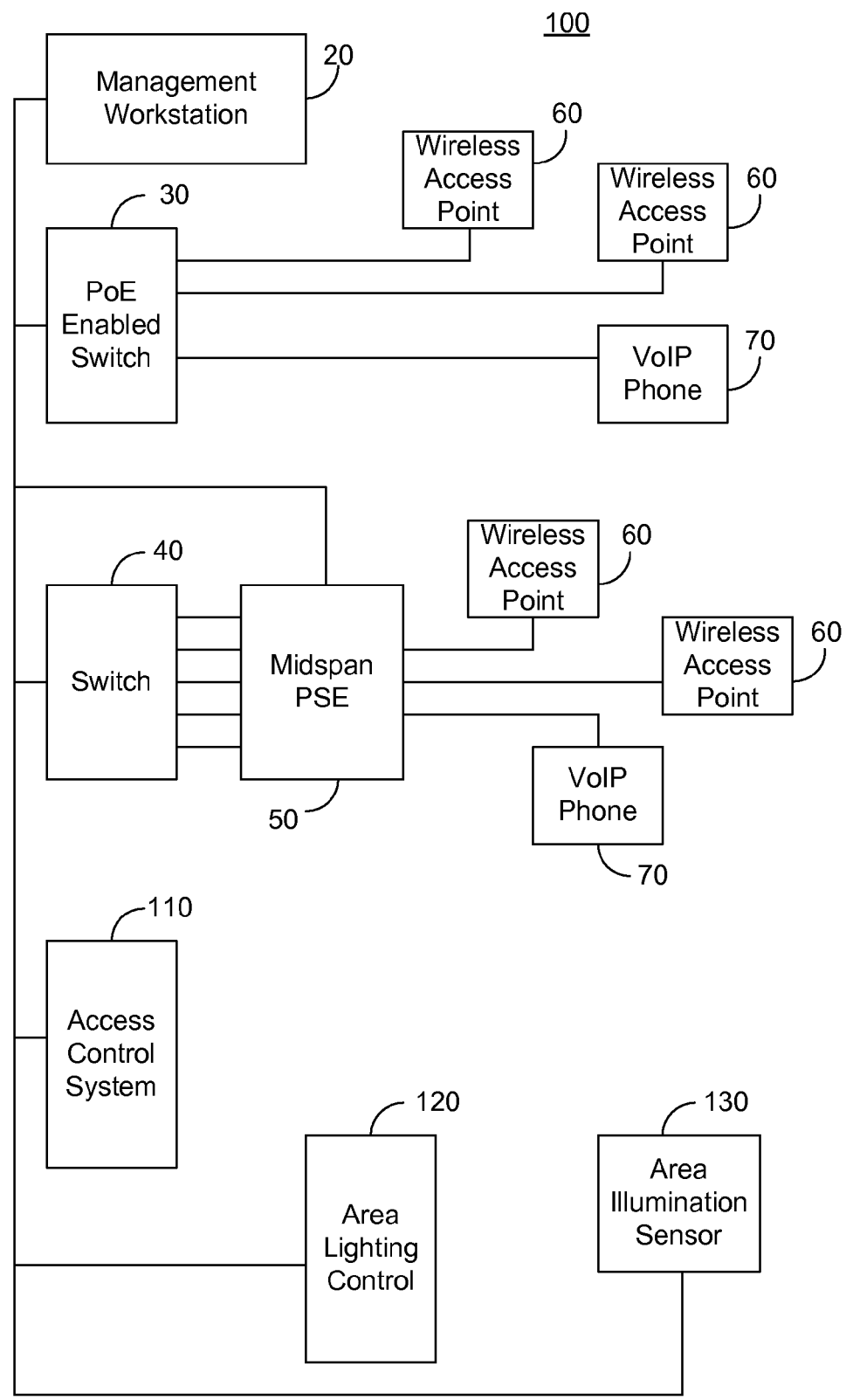
FIG. 2 is a high level block diagram of a second embodiment of a PoE system having a plurality of ports and a management workstation running a network management system in accordance with a principle of the current invention, the PoE system exhibiting a connection to at least one of an access control system, an area lighting control and a local area illumination sensor.

FIG. 2 is a high level block diagram of a second embodiment of a PoE system, designated PoE system 100, having a plurality of ports and a management workstation running a network management system in accordance with a principle of the current invention, the PoE system exhibiting a connection to at least one of an access control system, an area lighting control and a local area illumination sensor. PoE system 100 comprises: a management work station 20; a PoE enabled switch 30; a switch 40; a midspan PSE 50; a plurality of WAPs 60; a plurality of VoIP telephones 70; an access control system 110; an area lighting control 120; and an area illumination sensor 130. It is it to be understood that in a typical embodiment of system 100 each VoIP telephone 70 and wireless access point 60 are connected via an associated TO, such as an RJ-45 jack.

Management work station 20 is connected through a network connection, either physical or logical, to PoE enabled switch 30, switch 40, midspan PSE 50, access control system 110, area lighting control 120 and area illumination sensor 130. PoE enabled switch 30 exhibits a plurality of ports, some of the plurality of ports being connected to a respective WAP 60 or VoIP telephone 70. Switch 40 exhibits a plurality of ports; at least some of the ports of switch 40 are connected midspan PSE 50. Midspan PSE 50 exhibits a plurality of ports; some of the plurality of ports being connected to a respective WAP 60 and VoIP telephone 70.

In operation, PoE enabled switch 30 provides data communication and supplies power over the data communication cabling for each WAP 60 and VoIP phone 70 connected thereto. PoE enabled switch 30 reports all powering events to management workstation 20, and further each port for which PoE enabled switch 30 supplies power to a connected PD may be enabled or disabled under control of management workstation 20. In one embodiment when a PoE supplying port of PoE enabled switch 30 is disabled, PoE enabled switch 30 does not act to periodically attempt to detect a valid PD connected to the disabled port. In another embodiment PoE enabled switch 30 continues to periodically attempt to detect a valid PD connected to the disabled PoE supplying port, however power is not supplied irrespective of the results of the detection.

Switch 40 provides data communication for each WAP 60 and VoIP phone 70 connected thereto via midspan PSE 50. Midspan PSE 50 provides power over the data communication cabling for each WAP 60 and VoIP phone 70 connected thereto. Midspan PSE 50 reports all powering events to management workstation 20, and further each port over which midspan PSE 50 supplies power to a connected PD may be enabled or disabled under control of management workstation 20. In one embodiment when a PoE supplying port of midspan PSE 50 is disabled, midspan PSE 50 does not act to periodically attempt to detect a valid PD connected to the disabled port. In another embodiment midspan PSE 50 continues to periodically attempt to detect a valid PD connected to the disabled PoE supplying port, however power is not supplied irrespective of the results of the detection.

Access control system 110 is operative to enable and record access of authorized personnel to the premises. Upon an authorized entry or exit event noted by access control system 110 a respective message is sent to management workstation 20. Area lighting control 120 is operative to enable illumination of one or more zones under control of one or more switches. Area lighting control 120 is further operative to send a respective message to management workstation 20 reporting on the illumination of a specific zone or zones. Area illumination sensor 130 is operative to sense illumination of one or more zones and to send a report to management workstation 20 reporting on the sensed illumination of a specific zone or zones.

It is to be understood that access control 110, area lighting control 120 and area illumination sensor 130 are each individually optional, and any combination of elements may be supplied without exceeding the scope of the invention. Additionally, other elements indicative of access or entry may be utilized without exceeding the scope of the invention, including but not limited to a motion detector. Additionally, system 100 may be designed in zones, with a first group of power over Ethernet supplying ports from one or more of PoE enabled switch 30 and midspan PSE 50 covering a first portion of space and a second group of power over Ethernet supplying ports from one or more of PoE enabled switch 30 and midspan PSE 50 covering a second portion of space. In one embodiment, in an office premises occupying a plurality of floors, disabling and enabling of ports as will be described further hereinto below, may be accomplished by floors. In another embodiment, in an office premises occupying a large floor area which can be conveniently broken into zones, disabling and enabling of ports as will be described further hereinto below, may be accomplished by zones.

Management workstation 20 is operative to disable at least one designated port of PoE enabled switch 30 or midspan PSE 50 on a pre-determined scheduled basis. Management workstation 20 is further operative upon receiving a report from one or more of access control system 110, area lighting control 120 and area illumination sensor 130 to override the scheduled disabling of at least one port of PoE enabled switch 30 and/or midspan PSE 50. As described above, both the scheduled disabling and the override thereof may be done by zones, groups or floors. In one non-limiting example a production area may have the PoE supplying ports enabled and disabled on a first schedule and the management area may have a second group of PoE supplying ports enabled and disabled on a second schedule. PoE supplying ports of the production floor may be enabled overriding the scheduled disabling of ports responsive to a report from access control system 110 upon authorized entry of a production employee, while the PoE supplying ports of the management area may remain disabled according to the second pre-determined schedule. PoE supplying ports of the management area may be enabled overriding the scheduled disabling of ports responsive to a report from access control system 110 upon authorized entry of a management employee, while the PoE supplying ports of the production floor may remain disabled according to the first pre-determined schedule.

Figure 3:
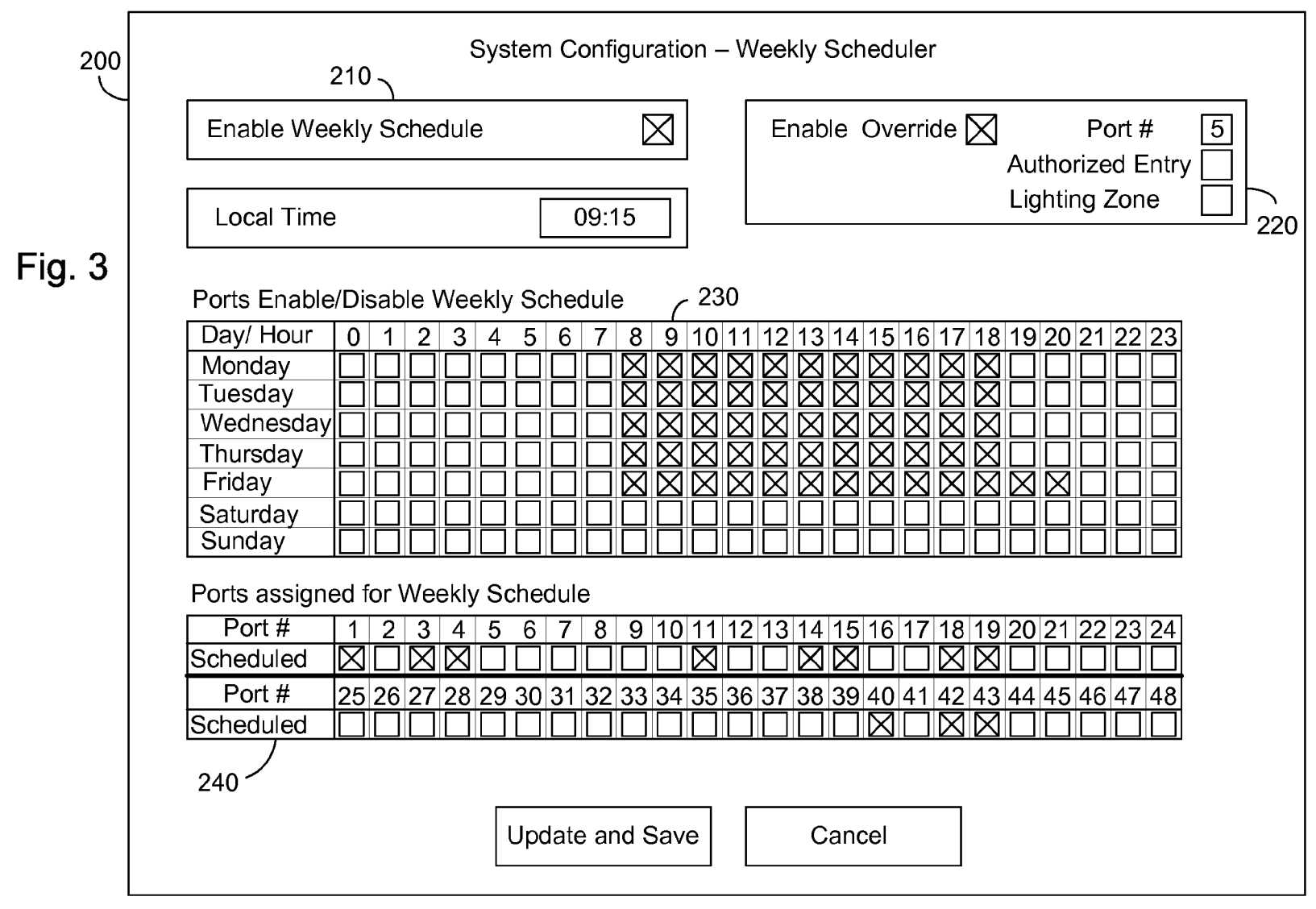

FIG. 3 is a high level block diagram of a user interface 200 for a scheduled disabling of ports and an override mechanism in accordance with a principle of the current invention. User interface 200 represents computer operable code for implementation on management workstation 20. User interface 200 comprises: an overall enabling field 210; an entry event override field 220; a weekly schedule field 230; and a port assignment field 240.

Overall enabling field 210 when selected as shown enables the operation of the scheduled disabling of ports. When overall enabling field 210 is not selected the scheduled disabling of ports does not occur.

Entry event override field 220 allows for the selection of an override event which is monitored, and its presence overrides the scheduled disabling of ports. In one embodiment a specific pre-selected PoE supplying port may be selected, illustrated as port #5, as described above in relation to the operation of FIG. 1. In another embodiment any authorized entry event is accepted to override the scheduled disabling of ports. In yet another embodiment a specific lighting zone, representing either a zone of area lighting control 120 or area illumination sensor 130 of FIG. 2 is selected to override the scheduled disabling of ports.

Weekly schedule field 230 allows the user to select PoE supplying ports to be disabled for specific hours each day of the week. Thus, in the illustration shown, ports which are to be enabled and disabled according the schedule are enabled on Monday from 08:00 through 18:59, on Tuesday from 08:00 through 18:59, on Wednesday from 08:00 through 18:59, on Thursday from 08:00 through 18:59 and on Friday from 08:00 through 20:59. The ports are disabled according to the schedule at all other times.

Port assignment field 240 allows the user to select which PoE supplying ports are to be included in the scheduled disabling and enabling of weekly schedule filed 230. Thus, in the illustration shown, ports 1, 3, 4, 11, 14, 15, 18, 19, 40, 42 and 43 are enabled and disabled according to the schedule of weekly schedule field 230. PoE supplying ports which are not checked are operative to supply power at all times. Thus, emergency telephone service may be supplied during a scheduled disabling of ports by deselecting ports to which VoIP telephones are connected.

FIG. 4 is a high flow chart of the operation of the management workstation of FIGS. 1 and 2 to disable ports on a scheduled basis, and override the scheduled disabling in accordance with a principle of the current invention. In stage 1000 the current time is input and in stage 1010 the input received via user interface 200 in overall enabling field 210 is inspected to determine whether the schedule is enabled. In the event that in stage 1010 the schedule is not enabled stage 1000 is again performed, preferably after a predetermined delay.

In the event that in stage 1010 the schedule is enabled, in stage 1020 override entry event as indicated in entry event override field 210 is inspected to determine whether an override event is enabled, and whether the enabled indicated override event is present, or active. For example, access control system 110 may be polled to indicate that all authorized employees have clocked out, area lighting control 120 may be polled to confirm that all lighting zones have been turned off, or area illumination sensor 130 may be polled to indicate that no lights are illuminated in selected zones. Alternatively, the PoE supplying port associated with the port number designated as the override key port in entry event override field 210 is polled to confirm that no valid PD is connected to the TO 80 associated therewith.

In the event that in stage 1020 the override event is not active, in stage 1030 selected ports are enabled or disabled in accordance with a pre-determined schedule. In an exemplary embodiment the ports are selected and the schedule determined using interface 200 described above in relation to FIG. 3.

In stage 1040, an entry event is monitored and the time clock is further monitored. In one embodiment the entry event is a report from an access control system, such as access control system 110 of FIG. 2, that an authorized user has entered the premises. In another embodiment the entry event is a report from an area lighting control, such as area lighting control 120 of FIG. 2, that illumination for an area has been energized. In yet another embodiment the entry event is a report from a area illumination sensor, such as area illumination sensor 130 of FIG. 2, that illumination in an area has been detected. In yet another embodiment the entry event is the detection of a PD connected to a designated TO, such as TO 80 of FIG. 1. In one embodiment the clock monitoring is accomplished by an interrupt set at a predetermined interval.

In stage 1050 the entry event monitored in stage 1040 is examined. In the event the selected entry event has been detected, in stage 1070 the selected ports disabled in stage 1030 in accordance with the pre-determined schedule are enabled, thereby overriding the scheduled disabling. It is to be understood that there is no requirement that all disabled ports of the system be overridden, or that all disabled ports be overridden responsive to a single entry event. The use of zones, or a plurality of sets of ports which are disabled according to a pre-determined schedule and the sets are respectively enabled by a predetermined associated entry event is specifically contemplated as part of the invention.

In stage 1080 the entry event of stage 1050, 1020 is monitored to determine if the entry event 1010 remains active or has concluded. In one embodiment conclusion of the entry event is a report from access control system 110 of FIG. 2 that the authorized visitor has departed. In another embodiment conclusion of the entry event is a report from area lighting control 120 of FIG. 2, indicating that the illumination event has been terminated. In yet another embodiment conclusion of the entry event is a report from area illumination sensor 130 of FIG. 2 that the illumination is no longer present. In yet another embodiment conclusion of the entry event is the detection that a PD has been disconnected from the designated TO, such as TO 80 of FIG. 1.

The above has been described in which the entry event and the conclusion thereof are for the same event. This is not meant to be limiting in any way, and is specifically meant to include using a combination of events, or one or more events for entry and one or more different events for the conclusion of the entry event.

In stage 1090 the entry event conclusion monitored in stage 1080 is examined. In the event the conclusion of the entry event has been detected, stage 1030 as described above is performed. In the event the conclusion of the entry event has been not been detected, stage 1080 described above is again performed. It is to be noted that preferably the clock need not be monitored as no port disabling will occur due to the entry event irrespective of the clock, however this is not meant to be limiting in any way. In another embodiment, the clock is examined as certain ports may be disabled irrespective of the status of the entry event.

In the event that in stage 1020 the override event is active, stage 1070 as described above is performed. In this manner the scheduled disabling is not begun until the entry event is concluded. Thus, for example, ports will not be disabled according to the schedule, as described in relation to stage 1030, while an authorized employee remains on site.

In the event that in stage 1050 the selected entry event has not been detected, in stage 1060 the clock monitored in stage 1040 is examined to determine if a scheduled change in port enabling or disabling is required due to the advancing of the clock. For example, in accordance with user interface 200 of FIG. 3, only on the hour are changes enabled. In the event that a time schedule change is detected, stage 1030 as described above is performed. In the event that in stage 1060 a time schedule change is not detected, stage 1040 as described above is again performed, preferably after a predetermined delay.

Thus, the present embodiments enable a method of designating ports to be disabled on a predetermined scheduled basis and associating therewith a particular entry event which is designated to act as an override key. In an exemplary embodiment the entry event is a PoE device being detected connected to a designated override key port which is an open TO, i.e. a TO to which no data terminal device is connected.

The override key port, upon detection of a valid PD, reports the detection to the management work station, which in response overrides the predetermined scheduled disabling and enables the associated disabled ports. Thus, PoE for a group of ports is enabled responsive to a single detected PD. The override key port is further monitored to detect disconnection of the PD. Upon detection of the disconnection, the disconnection is reported to the management work station, which in response reinstates the predetermined scheduled disabling and disables the associated ports.

The valid PD to be used as a key may be a normal device, or a dedicated key designed specifically to be detected as a valid PD. In one embodiment the detected PD comprises a PD tester.

In another embodiment the entry event is an event recorded by an access control system such as an alarm system. In yet another embodiment the entry event is the enabling of illumination in a pre-designated area and in yet another embodiment the entry event is sensing illumination in a pre-designated area.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A method of controlled enabling and disabling of ports, the method comprising:
   providing a plurality of power over Ethernet supplying ports;
   disabling at least one first power over Ethernet supplying port of said provided plurality of ports on a predetermined scheduled basis;
   detecting a powered device on a second power over Ethernet supplying port of said provided plurality of power over Ethernet supplying ports, said second power over Ethernet supplying port being a different port than said disabled at least one first power over Ethernet supplying port; and
   responsive to said detected powered device, enabling said disabled at least one first power over Ethernet supplying port.

2. A method according to claim 1, further comprising:
   monitoring at least one parameter of said second power over Ethernet supplying port indicative of a connection status of said detected powered device; and
   in the event said monitored parameter is indicative that said powered device has been disconnected, disabling said at least one first power over Ethernet supplying port in accordance with said predetermined scheduled basis.

3. A method according to claim 2, further comprising:
   in the event said monitored parameter is not indicative that said powered device has been disconnected, maintaining said enabling.

4. A method according to claim 2, wherein said monitored parameter is one of a DC maintain power signature component and an AC maintain power signature component.

5. A method according to claim 1, wherein said powered device detected on the second power over Ethernet supplying port is functionality limited to being detected as a powered device and maintaining parameters indicative of connection.

6. A method according to claim 1, wherein said at least one first power over Ethernet supplying port represents a group of power over Ethernet supplying ports within a first power sourcing equipment.

7. A method according to claim 6, wherein said second power over Ethernet supplying port is associated with a second power sourcing equipment different than said first power sourcing equipment.

8. A method of scheduled disabling of ports, the method comprising:
   providing a plurality of power over Ethernet supplying ports;
   disabling at least one first power over Ethernet supplying port of said provided plurality of power over Ethernet supplying ports on a predetermined scheduled basis;
   detecting a first entry event; and
   responsive to said detected first entry event, enabling said disabled at least one first power over Ethernet supplying port.

9. A method according to claim 8, wherein said first entry event indication comprises an authorized entry signal from an entry access system.

10. A method according to claim 8, wherein said first entry event comprises switching a pre-determined switch.

11. A method according to claim 8, wherein said first entry event comprises illuminating area lighting.

12. A method according to claim 8, wherein said first entry event comprises illumination of at least one lighting zone.

13. A method according to claim 8, wherein said first entry event comprises a powered device being connected at a predetermined one of said provided plurality of power over Ethernet supplying ports.

14. A method according to claim 8, further comprising:
   detecting conclusion of a second entry event, and
   responsive to said detected conclusion of said second entry event, disabling said enabled at least one first power over Ethernet supplying port of said provided plurality of power over Ethernet supplying ports on said predetermined scheduled basis.

15. A method according to claim 14, wherein said first entry event and said second entry event are the same.

16. A system for power over Ethernet comprising:
   a plurality of power over Ethernet supplying ports; and
   a management station in communication with each of said plurality of power over Ethernet supplying ports,
   said management station arranged to disable at least one first power over Ethernet supplying port of said plurality of power over Ethernet supplying ports on a predetermined scheduled basis;

receive an indication of an entry event; and enable said disabled at least one first power over Ethernet supplying port responsive to said received entry event indication.

17. A system according to claim 16, wherein said entry event indication comprises detection of a valid powered device at a second power over Ethernet supplying port.

18. A system according to claim 17, wherein said management station is further arranged to:

receive an indication of disconnection of said detected valid powered device from said second power over Ethernet supplying port; and responsive to said received indication of disconnection disable said enabled at least one first power over Ethernet supplying port on said pre-determined scheduled basis.

19. A system according to claim 17, wherein said second power over Ethernet supplying port is different from said at least one first power over Ethernet supplying port.

20. A system according to claim 16, wherein said entry event indication comprises a signal from an entry access system.

21. A system according to claim 16, wherein said entry event indication comprises operation of a pre-determined switch.

22. A system according to claim 16, wherein said entry event indication comprises illuminating area lighting.

23. A system according to claim 16, wherein said management station is further arranged to:

receive an indication of a conclusion of said indicated entry event, and responsive to said received indication of the conclusion of said indicated entry event, disable said at least one first power over Ethernet supplying port of said provided plurality of power over Ethernet supplying ports on said predetermined scheduled basis.

24. A system according to claim 16, wherein said at least one first power over Ethernet supplying port comprises a third and a fourth Ethernet supplying port, and wherein said enabling of said first power over Ethernet supplying port responsive to said received indication of an entry event is constituted of enabling said third Ethernet supplying port and not enabling said fourth Ethernet supplying port.

* * * * *